US010843945B2

(12) United States Patent
Scott et al.

(10) Patent No.: US 10,843,945 B2
(45) Date of Patent: Nov. 24, 2020

(54) PILOT FILTER FOR A WATER TREATMENT SYSTEM

(71) Applicants: David James Scott, Toronto (CA); Derek French, Scarborough (CA)

(72) Inventors: David James Scott, Toronto (CA); Derek French, Scarborough (CA)

(*) Notice: Subject to any disclaimer, the term of this patent is extended or adjusted under 35 U.S.C. 154(b) by 244 days.

(21) Appl. No.: 15/406,853

(22) Filed: Jan. 16, 2017

(65) Prior Publication Data
US 2018/0200648 A1 Jul. 19, 2018

Related U.S. Application Data

(60) Provisional application No. 62/279,218, filed on Jan. 15, 2016.

(51) Int. Cl.
C02F 1/52 (2006.01)
C02F 1/28 (2006.01)
C02F 1/00 (2006.01)

(52) U.S. Cl.
CPC ............ *C02F 1/5209* (2013.01); *C02F 1/004* (2013.01); *C02F 1/283* (2013.01); *C02F 2209/003* (2013.01); *C02F 2209/11* (2013.01); *C02F 2301/046* (2013.01)

(58) Field of Classification Search
CPC .................................................. C02F 1/5209
See application file for complete search history.

(56) References Cited

U.S. PATENT DOCUMENTS

| 3,393,149 | A |   | 7/1968 | Conley et al. |
| 4,675,112 | A |   | 6/1987 | Verde et al. |
| 4,855,061 | A | * | 8/1989 | Martin .................. C02F 1/5209 210/709 |
| 5,128,029 | A |   | 7/1992 | Herrmann |
| 6,027,642 | A | * | 2/2000 | Prince ....................... C02F 1/78 210/180 |
| 2003/0146171 | A1 |   | 8/2003 | Herrmann |
| 2005/0211644 | A1 | * | 9/2005 | Goldman ................ C02F 1/004 210/786 |
| 2006/0032807 | A1 | * | 2/2006 | Sansalone .............. B01D 15/00 210/263 |
| 2007/0181511 | A1 | * | 8/2007 | Smith ...................... C02F 1/001 210/792 |

(Continued)

OTHER PUBLICATIONS

International Search Report and Written Opinion relating to application No. PCT/CA2017/050265, dated Jun. 13, 2017.

(Continued)

*Primary Examiner* — Peter Keyworth
(74) *Attorney, Agent, or Firm* — Rowand LLP

(57) ABSTRACT

A pilot filter system for monitoring water quality in a water treatment system is disclosed. The pilot filter system includes: a filter vessel containing a downward-moving bed of filtration media, the filter vessel being fluidly connected to the water treatment system such that sample influent water from the water treatment system flows into the filter vessel and over the bed, wherein the filter vessel has a filtrate outlet port through which some filtrate is discharged; a media recycle conduit fluidly connected to the filter vessel; and a media recycler for circulating a mixture of water and used filtration media through the media recycle conduit to a point upstream of the bed in the filter vessel.

15 Claims, 4 Drawing Sheets

(56) References Cited

U.S. PATENT DOCUMENTS

| | | |
|---|---|---|
| 2009/0045135 A1 | 2/2009 | Khudenko et al. |
| 2013/0037489 A1 | 2/2013 | Jiang |
| 2013/0313191 A1* | 11/2013 | Wolf .................. C02F 9/00 210/638 |
| 2015/0090659 A1 | 4/2015 | Reid et al. |

OTHER PUBLICATIONS

DynaSand, EcoWash, Parkson Corporation, Nov. 3, 2016.
Lighthouse Filters, Volcano, Nov. 3, 2016.

* cited by examiner

PILOT FILTER FOR A WATER TREATMENT SYSTEM

CROSS-REFERENCE TO RELATED APPLICATION

The present application claims priority to U.S. Provisional Patent Application Ser. No. 62/279,218, filed on Jan. 15, 2016, the contents of which are incorporated herein in their entirety by reference.

TECHNICAL FIELD

The present disclosure relates to water treatment and, in particular, to monitoring and adjusting coagulation and filterability in a water treatment system.

BACKGROUND

Conventional water treatment systems employ large granular media filters (e.g. sand, anthracite, activated carbon, etc.) to remove particulate matter suspended in natural source waters. A common form of granular media filtration is rapid sand filtration, which relies on adding chemicals, or coagulants, to the water prior to filtration. Coagulants, such as aluminum sulphate, ferric sulphate, or ferric chloride, are added to the water to destabilize colloidal suspensions such that they may become attached to the filtration media. In the absence of coagulants, the colloids possess strong negative surface charges that create repulsive forces between the colloids as well as the filtration media. These repulsive forces prevent particles from agglomerating into large masses or contacting the media and becoming attached. Maintaining sufficient levels of coagulants in the water is an important primary step in the water treatment process.

During filtration, the filters collect solids and as the pore spaces become constricted with captured solids, more pressure is required to push the water through the filtration media. The difference in pressure between the hydrostatic pressure and the pressure at the base of an operating filter is referred to as head loss. When there is an insufficient level of coagulants in the water, the filter may stop accumulating solids and head loss will stop increasing. For some waters, if a coagulant shortage persists, the filter may begin shedding previously captured particles and allow new particles to pass directly through. If this occurs, the filter's head loss may decrease with time as the filter pores become less constricted. Initially, this change in head loss can occur without immediate changes in effluent particle counts or turbidity, as released solids are likely recaptured deeper in the filter. However, the filter effluent quality will eventually decrease as particles are exit the filter and colloids begin passing straight through the filter. As a consequence, the effluent turbidity increases and pathogen passage becomes more likely, with the result that the effluent water may be unfit for distribution.

While it may be attractive to add surplus coagulant in water to ensure that pathogens are removed in the filters, excess coagulants increases head loss, which can shorten a filter's run time and thereby decrease the amount of water that a facility can treat. Using excess coagulant is also expensive, due to the costs for the coagulant itself, as well as other possible considerations (pH correction chemicals and disposal of residuals). Because of these practical considerations, the coagulant dose must balance chemical costs with the risk of pathogen passage. Furthermore, the quality of the raw water entering a water treatment system is variable and may require more or less coagulant to achieve acceptable quality filter effluent.

As a result, water that is processed in a rapid sand treatment system may sometimes have insufficient coagulant, especially if the raw water quality degrades quickly and coagulant demand increases before an operator detects changes in the filter effluent water quality. It would be desirable to provide a system that is capable of facilitating the monitoring and correcting of coagulant doses in a timely manner.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
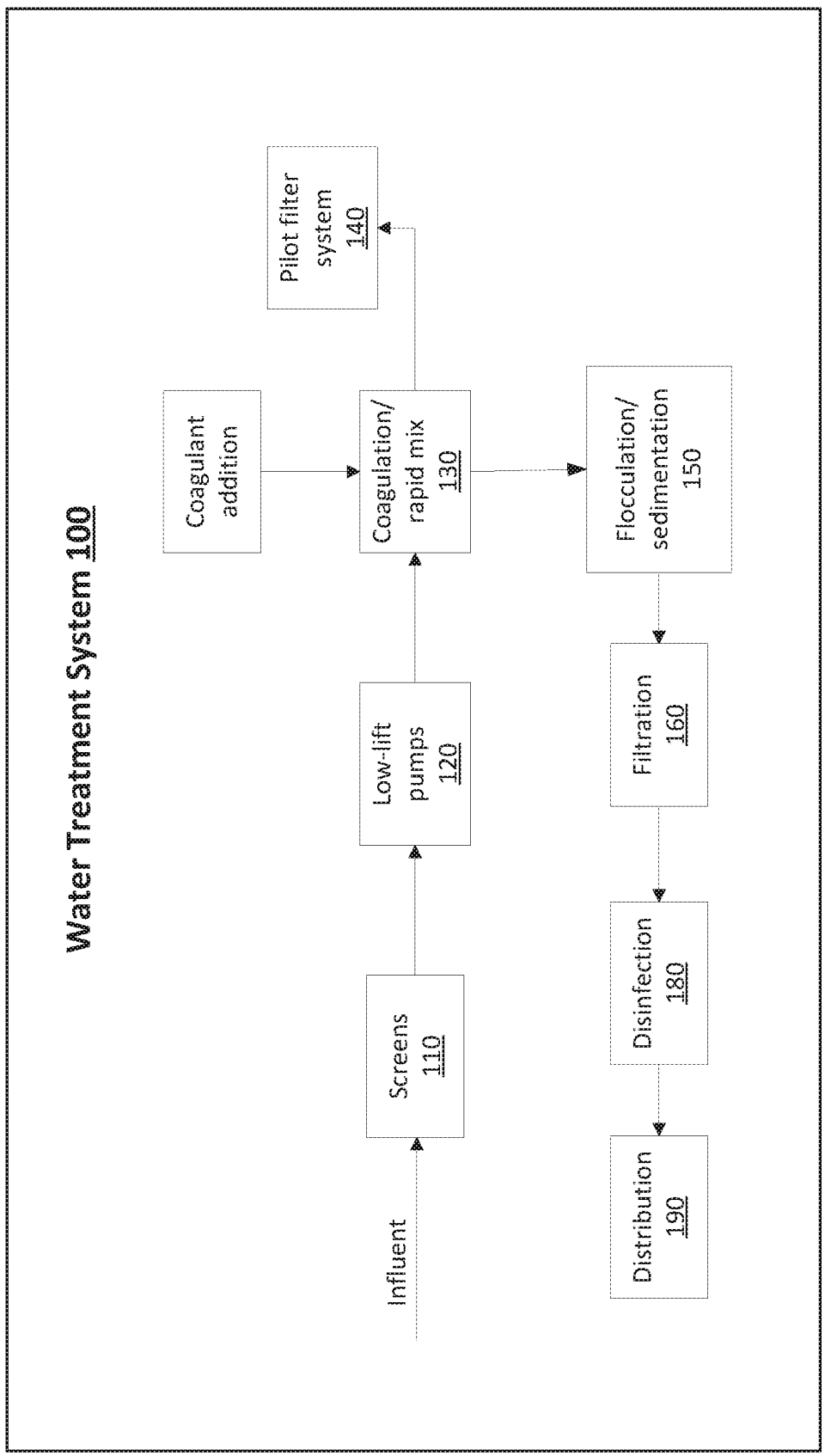
FIG. 1 is a schematic diagram of an example water treatment system in accordance with example embodiments of the present disclosure.

The present disclosure relates to a pilot filter system which is operated in parallel to a water treatment system (WTS). The pilot filter system can be used to sample pre-filtered water from the WTS to analyze coagulant and filtration conditions of the WTS. The pilot filter system includes a continuously washed filter which may be used to, for example, measure head loss and turbidity of filtrate of the sampled water, to provide feedback regarding the conditions of filterability of water in the WTS. In at least some embodiments, the pilot filter system of the present disclosure may indicate when to make adjustments to the level of coagulants in the WTS.

In one aspect, the present disclosure describes a pilot filter system for monitoring water quality in a water treatment system. The pilot filter system includes: a filter vessel containing a downward-moving bed of filtration media, the filter vessel being fluidly connected to the water treatment system such that sample influent water from the water treatment system flows into the filter vessel and through the bed, wherein the filter vessel has a filtrate outlet port through which some filtrate is discharged; a media recycle conduit fluidly connected to the filter vessel; and a media recycler for circulating a mixture of water and used filtration media through the media recycle conduit to a point upstream of the bed in the filter vessel.

In another aspect, the present disclosure describes a method of operating a water treatment system. The method includes providing a pilot filter system associated with the water treatment system, directing at least some water flowing through a first section of the water treatment system to the pilot filter system, and adjusting a level of coagulant dose in the water treatment system based on results of monitoring turbidity in the pilot filter system. The pilot filter system includes: a filter vessel containing a downward-moving bed of filtration media, the filter vessel being fluidly connected to the water treatment system such that sample influent water from the water treatment system flows into the filter vessel and through the bed, wherein the filter vessel has a filtrate outlet port through which some filtrate is discharged; a media recycle conduit fluidly connected to the filter vessel; and a media recycler for circulating a mixture of water and used filtration media through the media recycle conduit to a point upstream of the bed in the filter vessel.

In yet another aspect, the present disclosure describes a water treatment system. The water treatment system includes an inlet through which water is received into the water treatment system and a pilot filter system associated with the water treatment system. The pilot filter system includes: a filter vessel containing a downward-moving bed of filtration media, the filter vessel being fluidly connected to the water treatment system such that sample influent water from the water treatment system flows into the filter vessel and through the bed, wherein the filter vessel has a filtrate outlet port through which some filtrate is discharged; a media recycle conduit fluidly connected to the filter vessel; and a media recycler for circulating a mixture of water and used filtration media through the media recycle conduit to a point upstream of the bed in the filter vessel. The water treatment system also includes a coagulant controller for controllably adding coagulant to water processed by the water treatment system prior to filtration, the coagulant controller being configured to adjust a level of coagulant dose in the water treatment system based on results of monitoring turbidity in the pilot filter system.

Other example embodiments of the present disclosure will be apparent to those of ordinary skill in the art from a review of the following detailed descriptions in conjunction with the drawings.

Reference is first made to FIG. 1, which shows a schematic diagram of an example water treatment system (WTS) 100 in accordance with example embodiments of the present disclosure. Raw water is fed into the WTS 100 from an external source, such as a lake, river, or other surface water source. The raw water flows through a series of coarse screens or sieves (step 110) which remove larger solids from the water, before flowing to one or more low-lift pumps (step 120). These low-lift pumps provide the head that moves large volumes of the water through the rest of the WTS 100.

In step 130, coagulant is added to and mixed with the water. The rate and/or volume of coagulant addition, as well as adjustments thereto, may be automatically controlled by a coagulant controller that is implemented as a component of the WTS 100 or manually controlled by an operator of the WTS 100. As will be described in greater detail below, the level of coagulant dosed in pre-filtered water may be controlled in accordance with the results of sampling performed by a pilot filter system associated with the WTS 100. Such results of sampling may be communicated to an operator of the WTS 100 such that coagulant addition may be manually adjusted. Alternatively, the results of sampling may be fed as input to a coagulant controller configured to automatically adjust coagulant addition rates.

After coagulant addition, rapid mixing may be required to evenly distribute the coagulant through the water. The coagulated water may then proceed, in step 150, to pre-filtration treatment including, but not limited to, flocculation and sedimentation. The water is then filtered, in step 160, and processed through post-filtration, such as disinfection 180 and, ultimately, distribution 190 as effluent of the WTS 100.

In at least some embodiments, some of the coagulated water may be diverted to a pilot filter system in step 140. That is, the pilot filter system may be continuously fed with some of the water that has undergone coagulant addition and subsequent rapid mixing in the WTS 100. The water that is diverted to the pilot filter system may be taken as being representative of coagulated water in the WTS 100. In particular, the pilot filter system may be used to continuously sample coagulated water from the WTS 100 to analyze various properties associated with such samples. The proportion of coagulated water in the WTS 100 that is diverted to the pilot filter system may be regulated (for example, by a combination of pumps and/or valves in the WTS 100). In some other embodiments, the feed water to the pilot filter system may come from a different point in the WTS 100. For example, the water that is diverted to the pilot filter system may be flocculated water, pre-filtered water (e.g. post-sedimentation, but upstream of filtration), or pre-coagulant water.

Figure 2:
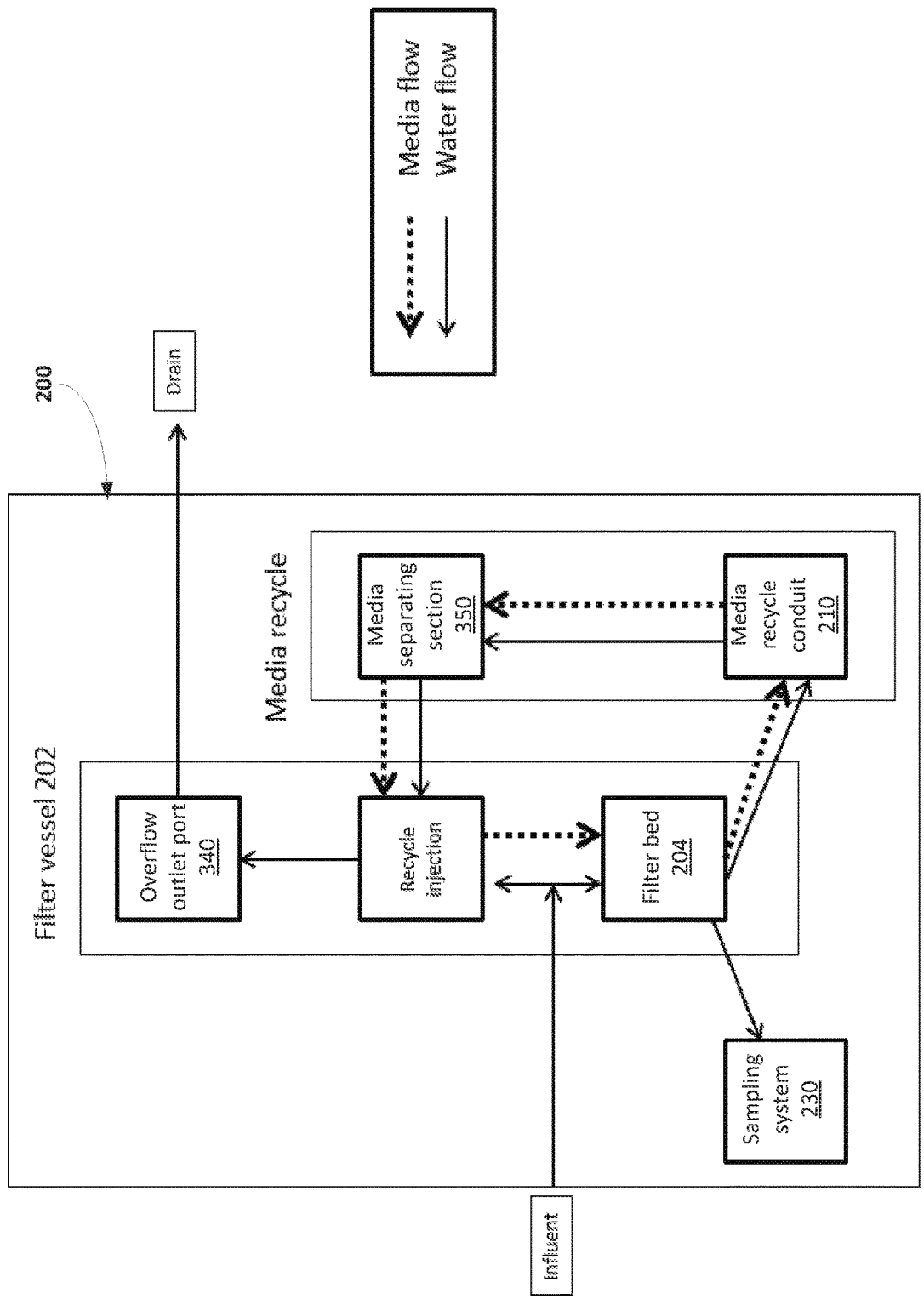
FIG. 2 is a schematic diagram showing progression of influent water in an example pilot filter system associated with the water treatment system of FIG. 1.
Figure 3:
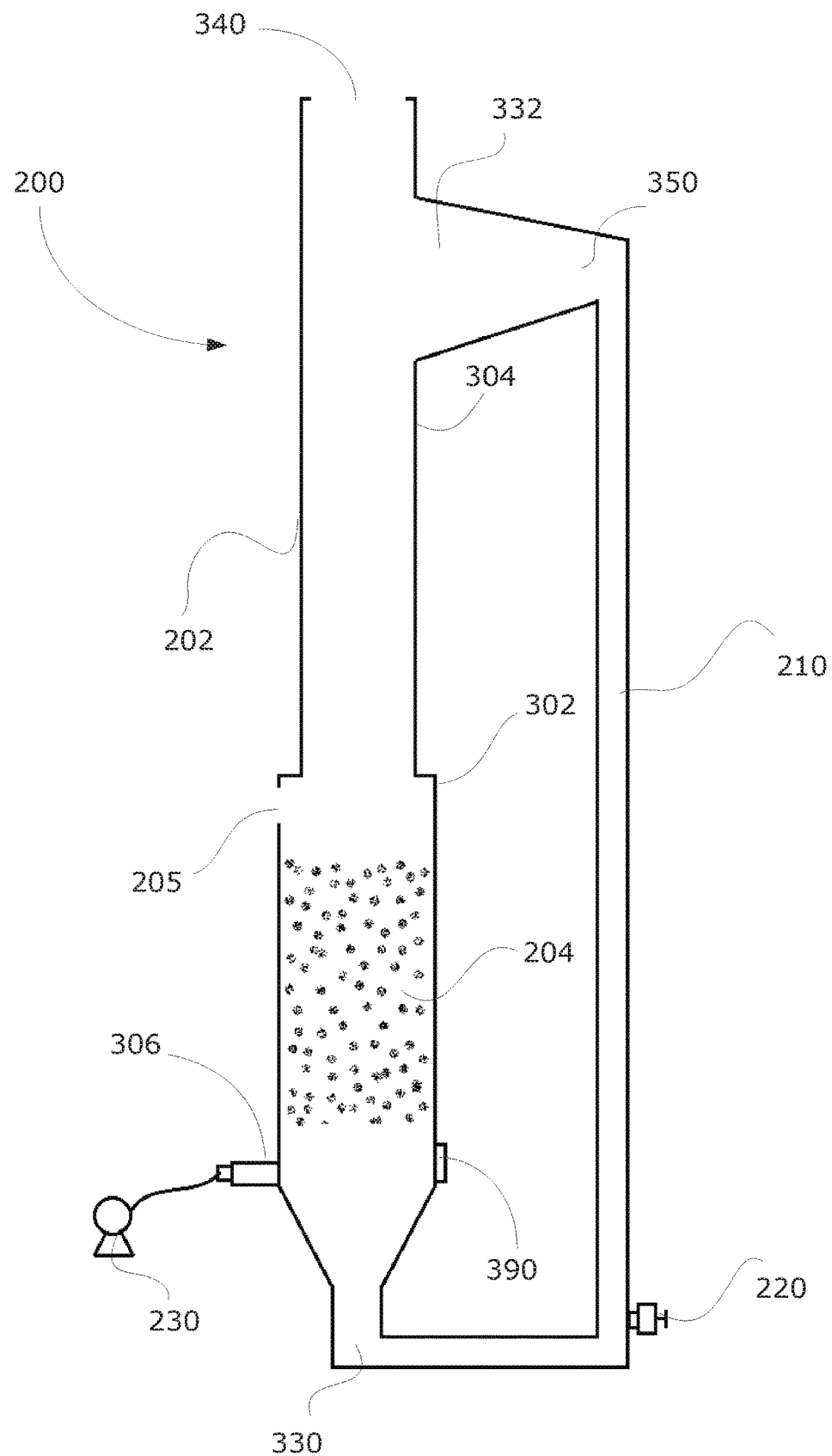
FIG. 3 illustrates components of the example pilot filter system of FIG. 2.

Reference is now made to FIG. 2, which shows a schematic diagram showing progression of influent water in an example pilot filter system 200 associated with the WTS 100 of FIG. 1, and FIG. 3, which illustrates components of the pilot filter system 200. The pilot filter system 200 operates continuously in parallel with the WTS 100 and can be used to analyze various filtration conditions and parameters (e.g. coagulation, filterability) associated with water sampled from the WTS 100. More specifically, some of the water processed in the WTS 100 is diverted to the pilot filter system 200, and a portion of the diverted water is filtered through the pilot filter system 200 and is sampled to obtain various measures of water quality. In particular, the pilot filter system 200 may monitor values of one or more parameters associated with the sample water (e.g. turbidity, UV transmittance, etc.) to detect any changes in coagulant condition of the WTS 100. In at least some embodiments, head loss through the pilot filter system 200 is measured and monitored for changes.

The pilot filter system 200 is used for monitoring the quality of water and conditions of water treatment in the WTS 100. The pilot filter system 200 may be an integrated component of the WTS 100, or it may be an independent system or collection of devices that is connected to the WTS 100. For example, the pilot filter system 200 may be formed as an add-on which is removably connected to the WTS 100.

The pilot filter system 200 includes a filter vessel 202. The filter vessel 202 contains a downward-moving bed 204 of filtration media. In particular, the bed 204 comprises granular filtration material (such as sand, anthracite, activated carbon, garnet, ilmenite, resin, plastic, etc.) which moves continuously downward toward a bottom end of the filter vessel 202. The filtration media of the bed 204 are similar to or are the same as those used in the filtration process of the WTS 100. In some embodiments, the bed 204 comprises spherical filtering particulate. The bed 204 may include granular spherical ceramic sand, with grain sizes ranging from 0.1 to 2.0 millimeters. For example, the grain size of the sand may be 0.2 millimeter.

The filter vessel 202 is fluidly connected to the WTS 100. For example, one or more water pipes may extend between a first section (e.g. post-coagulant addition) of the WTS 100 and an inlet port 205 of the filter vessel 202. The inlet port 205 is an opening into the filter vessel 202, and is positioned at a level above the bed 204. For example, the inlet port 205 may be an aperture defined on a sidewall of the filter vessel 202. The sample influent water diverted from the WTS 100 flows into the filter vessel 202 and over the bed 204, i.e.

through the inlet port 205, such that the water can descend, under the influence of gravity, through the bed 204 for filtration. In some embodiments, the pilot filter system 200 includes an influent pump 206 (not shown) for controllably injecting the sample influent water into the filter vessel 202. For example, the influent water from the WTS 100 may be transported via pipes to the influent pump 206, which modulates the rate and/or volume of injection of the influent water into the filter vessel 202. For example, the influent pump 206 may maintain an influent flow rate of between 125 and 225 milliliters per minute. The influent water diverted from the WTS 100 may be fed into the filter vessel 202 at a rate that is similar to the rate of loading of coagulated water to the filters of the WTS 100. In particular, the pilot filter system 200 may emulate the filtering conditions (e.g. influent loading rate, filtration media types, etc.) of the associated WTS 100.

The pilot filter system 200 also includes a media recycle conduit 210. The media recycle conduit 210 is fluidly connected to the filter vessel 202, and is used in circulating used filtration media from the base of the bed 204 to an upper end of the filter vessel 202 for redepositing on top of the bed 204. As the bed 204 moves continuously downward within the filter vessel 202, filtration media from the base (or bottom portion) of the bed 204 settles toward the bottom of the filter vessel 202. The settling/used filtration media can be removed from the bottom of the bed 204 by, for example, channeling the used filtration media toward the media recycle conduit 210. For example, the settling/used filtration media may be guided by internal walls of the filter vessel 202 to slide toward an inlet of the media recycle conduit 210. In at least some embodiments, the used filtration media mixes with some filtrate passing down through the bed 204 and air injected into a bottom portion of the media recycle conduit 210 to produce an aerated mixture which flows toward the media recycle conduit 210.

The pilot filter system 200 includes a media recycler 220. The media recycler 220 continuously circulates the mixture of water and used filtration media through the media recycle conduit 210 to a point upstream of the bed 204 in the filter vessel 202. In particular, the media recycler 220 may draw the aerated mixture from the bottom of the filter vessel 202 and convey the mixture up the media recycle conduit 210 to re-introduce the used filtration media at a point on the filter vessel 202 that is above the bed 204. In at least some embodiments, the media recycler 220 may clean the used filtration media by, for example, separating solid particles that were suspended in the used filtration media from the aerated mixture. The cleaned filtration media is redeposited on top of the bed 204 within the filter vessel 202. The media recycler 220 will be described in greater detail below with reference to FIG. 3.

In some embodiments, the pilot filter system 200 may include a filtrate sampling system 230. The filtrate sampling system 230 may comprise an integrated component of the filter vessel, or it may be an independent system or collection of devices that is fluidly connected to the filter vessel 202. The filtrate sampling system 230 can be used to collect sample filtrate from the filter vessel 202 and analyze the filtrate for various parameters, such as water content and quality. For example, at least some of the filtrate passing through the bed 204 may be discharged from the filter vessel 202 and directed toward the filtrate sampling system 230. The filtrate sampling system 230 may be useful for obtaining data relating to the sample filtrate, such as water quality (e.g. turbidity) and UV transmittance. That is, some of the water that is diverted from the WTS 100 to the pilot filter system 200 may be filtered and processed in a filtrate sampling system 230 to obtain data relating to representative samples of water in the WTS 100.

In at least some embodiments, the filter vessel 202 comprises an elongate and vertically-oriented tubular body. For example, the height of the filter vessel 202 may range between 0.9 and 1.5 metres. In some embodiments, the filter vessel 202 may be a generally cylindrical tank having two or more vertically contiguous sections of different cross-sectional area. In the example shown in FIG. 3, the filter vessel 202 comprises a substantially tubular filtering section 302, a narrower stem section 304 which extends upward from the filtering section 302. Both the filtering section 302 and the stem section 304 may each be cylindrical with uniform cross-sectional area. For example, the filtering section 302 may have a diameter (i.e. internal diameter) ranging between 19 and 50 millimeters and the stem section 304 may have a diameter ranging between 12 and 25 millimeters. For example, the filtering section 302 may have a diameter of 25 millimeters and a height of 30 centimeters with a media depth of between 8 and 20 centimeters, and the stem section 304 may have a diameter of 19 millimeters and a height of between 30 and 90 centimeters. In some embodiments, the filtering section 302 and the stem section 304 may be separated by one or more vertical sections which serve to increase the overall height of the filter vessel 202.

In some embodiments, the filter vessel 202 may be narrower near its bottom end; for example, in FIG. 3, the lower end of the filter vessel 202 is shaped as an inverted cone. This narrowing of the filter vessel toward its bottom end may provide a funneling effect for the filtered water and used filtration media to move toward the media recycle conduit 210. That is, a funnel-shaped bottom end of the filter vessel 202 may facilitate movement of the used filtration media and filtrate toward the media recycle conduit 210 for cleaning of the media and recycling.

The filter vessel 202 includes a filtrate outlet port 306 through which at least some of the filtrate passing through the bed 204 is discharged. The filtrate outlet port 306 is positioned near a bottom end of the filter vessel 202. In particular, the filtrate outlet port 306 may be located entirely below the bed 204 or at a level that is below most of the bed 204 in the filter vessel 202. For example, the filtrate outlet port 306 may be positioned just above (e.g. within 5 centimeters) a funneling lower portion of the filter vessel 202 (e.g. near or at the bottom end of the filtering section 302), as shown in FIG. 3. One or more screens may be provided to cover the filtrate outlet port 306 such that filtration media is prevented from being removed through the filtrate outlet port 306. For example, a media retention screen, such as a wedge wire screen, may be used to cover the filtrate outlet port 306. The screen may include slots running parallel to a central axis of the filter vessel 202. In some embodiments, the screen may comprise a cylinder made with 1 millimeter wide wires. For example, the cylinder may be 10 millimeters long, with a total open area of approximately 35 square millimeters, and the slots between the wires may, for example, have a width of 0.1 millimeter. In some embodiments, an effluent pump and/or one or more pipe valves may be used to control the rate and/or quantity of filtrate that is discharged from the filter vessel 202 through the filtrate outlet port 306. For example, an effluent pump may maintain a constant filtrate outflow rate, which may be adjusted based on, for example, the rate of descent of the downward moving filtration media and/or the media recycling rate. The pumps that are employed in the pilot filter system 200 (e.g. influent pump, effluent pump, etc.) may be peristaltic pumps which are, for example, fitted with variable speed stepper motors. In some other embodiments, the relative positioning and size of the filtrate outlet port 306 may determine the rate and/or quantity of discharged filtrate. For example, the filtrate outlet port 306 may be positioned on a slanted sidewall of the filter vessel 202 such that filtrate water is discharged from the filter vessel 202. Some of the filtrate that is not discharged from the filter vessel 202 may, for example, be channeled toward the media recycle conduit 210.

The filter vessel 202 also includes a first media recycle port 330 positioned at a level below the bed 204 and a second media recycle port 332 positioned at a level above the bed 204. The first media recycle port 330 and the second media recycle port 332 provide an inlet and an outlet, respectively, to the media recycle conduit 210. In particular, the media recycle conduit 210 provides fluid communication between the first media recycle port 330 and the second media recycle port 332. As can be seen in FIG. 3, in some embodiments, the media recycle conduit 210 comprises a substantially vertical pipe extending externally of the filter vessel 202 between the first media recycle port 330 and the second media recycle port 332. For example, the media recycle conduit 210 may include a vertical pipe section having an internal diameter of between 4 and 7 millimeters. More generally, the media recycler 220 of the pilot filter system 200 causes continuous upward flow of the mixture of water and used filtration media in the media recycle conduit 210. For example, the media recycler 220 may comprise an air lift pump which injects air into the media recycle conduit 210 to convey an aerated mixture of water and filtration media up toward an upper end of the filter vessel 202 (e.g. toward the second media recycle port 332). As a further example, in some embodiments, an auger lift may be employed to move the aerated mixture of water and filtration media up the media recycle conduit 210.

As the mixture of water and used filtration media travels through the media recycle conduit 210, solid particles (such as dirt) that were attached to the used filtration media may be detached to yield cleaned filtration media for re-introduction to the filter vessel 202. In at least some embodiments, the media recycle conduit 210 includes a media separating section 350 in which cleaned filtration media is separated from the aerated mixture of water and suspended dirt. For example, the media separating section 350 may be located at the top of the media recycle conduit 210 and adjacent to the second media recycle port 332. Such configuration for the media recycle conduit 210 may allow the cleaned filtration media to be channeled from the media separating section 350 toward the second media recycle port 332 to re-enter the filter vessel 202.

The filter vessel 202 has an overflow outlet port 340 positioned at a level above the bed 204. For example, the overflow outlet port 340 may be positioned at the top of the filter vessel 202, i.e. an open top of the filter vessel 202 may be the overflow outlet port 340. The overflow outlet port 340 is fluidly connected to the media recycle conduit 210. In at least some embodiments, solid particles that are separated from the cleaned filtration media may be washed out from the pilot filter system 200 via the overflow outlet port 340. As the cleaned filtration media pours down through the second media recycle port 332, the recycled water and solid particles cleaned from the used filtration media should be removed from pilot filter system 200. This may be achieved by controlling the inlet water flow rate into the filter vessel 202 from the WTS 100 such that the influent flow rate is greater than the actual filtration rate (i.e. the amount of water passing through the bed 204 of filtration media), resulting in a substantial portion of the inlet water being carried upward within the filter vessel 202 toward the overflow outlet port 340. The overflow outlet port 340 allows the surplus inlet water to push the recycled water and the suspended solid particles (e.g. dirt) from the media recycle conduit 210 to exit the filter vessel 202 (for example, to flow to drain). The cleaned filtration media is dense enough that it sinks and is redeposited through the second media recycle port 332 on top of the bed 204.

In at least some embodiments, the pilot filter system 200 includes a filtrate sampling system 230. The filtrate sampling system 230 is continuously fed with a portion of the filtrate passing through the bed 204, and may be used to analyze filterability conditions of the WTS 100 based on the sampled filtrate. The filtrate sampling system 230 may signal whether and/or when to make adjustments to various control parameters associated with the WTS 100. For example, the filtrate sampling system 230 may indicate when to adjust the level of coagulants added to pre-filtered water in the WTS 100. In at least some embodiments, the filtrate sampling system 230 includes instruments such as turbidimeters, particle counters, total organic carbon (TOC) analyzers, pH meters, etc. which can be used to analyze the sample filtrate that is discharged from the filter vessel 202. The pilot filter system 200 may also include a pressure gauge that is configured to measure hydraulic pressure in or below the bed 204 within the filter vessel 202. For example, a pressure port 390 may be included near a bottom portion of the filter vessel 202 and equipped with a pressure gauge, such that measurements of water pressure can be obtained (e.g. to determine head loss in the filter).

With regard to head loss, the head loss across the pilot filter system 200, as well as the main filter in the WTS 100, is a function of, among others, water flow rate through the filtration media (e.g. loading rate), media size and porosity, water temperature, and solids removal by the filter. If the pilot filter system 200 is operated at a constant loading rate, a primary factor influencing head loss is solids removal. The more solids that are trapped by the bed 204, the more head loss there is due to the increased resistance in the bed 204 caused by the suspended solids. Head loss can be calculated by subtracting the pressure at the bottom of a filter from the hydrostatic pressure. Thus, in at least some embodiments, head loss in a filter can be measured and used as an individual indicator of coagulation/filterability in the treated water.

Since the pilot filter system 200 operates continuously such that the water flows, air flows, and media recycling occur at a constant rate, the filter turbidity and head loss should remain constant if the quality of the coagulated water remains the same. Any change in the coagulant condition of the pre-filtered water of the WTS 100 will cause change in head loss and/or filter turbidity in the pilot filter system 200. Based on measurements of turbidity of sampled water from the WTS 100 that is subsequently processed through the pilot filter system 200, the pilot filter system 200 may provide continuous analysis of coagulation/filterability in the WTS 100 and signal whether to make adjustments to coagulant levels in the WTS 100 without undue delay.

The pilot filter system 200 may also include a controller which controls the overall operation of the pilot filter system 200, and a communication subsystem that is configured to transmit data from the pilot filter system 200. For example, the communication subsystem may transmit data generated by components (such as analytical instruments) of the filtrate sampling system 230 to a control system (such as a supervisory control and data acquisition (SCADA) system) associated with the WTS 100, which an operator of the WTS 100 may interpret and act upon. The controller may include at least one processor (such as a microprocessor) that is coupled to the communication subsystem. The controller may be coupled to and interact with controls for one or more of the pumps (e.g. influent pump, effluent pump), instruments of the filtrate sampling system 230 (such as a turbidimeter), pressure gauge, and media recycler (e.g. air lift pump) of the pilot filter system 200. The pilot filter system 200 may also include memory (e.g. data storage medium, coupled to the controller, which may be organized, at least partially, into one or more databases or data stores containing measurement data collected by components of the filtrate sampling system 230 and/or the pressure gauge.

In some embodiments, a controller of the pilot filter system 200 may be configured to detect and analyze changes in filtrate turbidity and/or head loss through the bed 204 based on measurements obtained from the filtrate sampling system 230 and/or the pressure gauge. For example, the controller may determine if values of filtrate turbidity or head loss have changed by more than a preset amount. The controller may also be configured to detect whether the filtrate turbidity or head loss in the pilot filter system 200 exceed or drop below predetermined threshold values. In such cases, the controller may generate alerts or message notifications for transmitting to an external source, such as a SCADA operator or a control system for the WTS 100.

Figure 4:
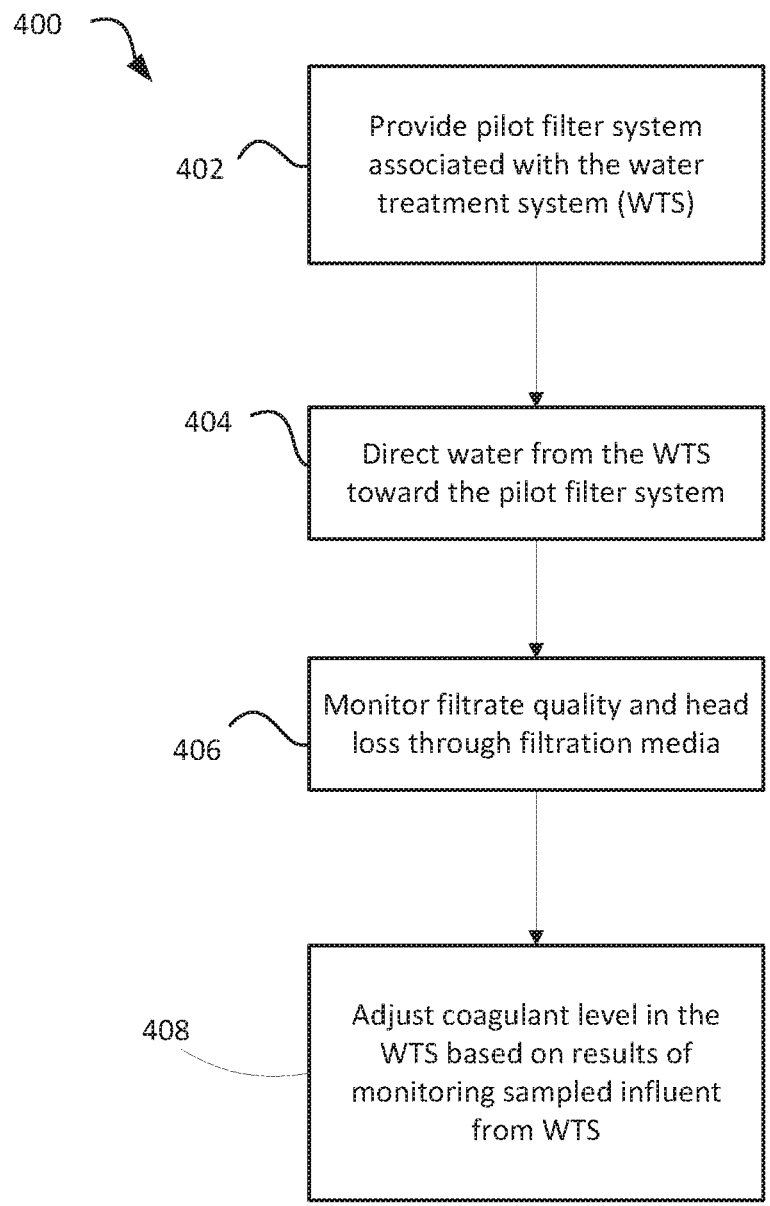
FIG. 4 shows, in flowchart form, an example method of operating a water treatment in accordance with example embodiments of the present disclosure.

Reference is now made to FIG. 4, which shows, in flowchart form, an example method 400 of operating a water treatment system (WTS), such as WTS 100 of FIG. 1. The method 400 may be implemented manually by a human operator of a WTS, automatically by a series of controls for various components of a WTS, or manually in-part and automatically in-part. In at least some embodiments, the method 400 may be employed to monitor coagulation and correct the level of coagulant dose in the water that is processed by a WTS.

In operation 402, a pilot filter system, such as the pilot filter system 200 of FIGS. 2 and 3, which is associated with the WTS is provided. For example, a pilot filter system may be connected to the WTS as an add-on feature or as a built-in component. The connection maintains a fluid communication between the pilot filter system and the WTS. In particular, at least some of the water being processed through the WTS can be diverted to flow through the pilot filter system.

In operation 404, a portion of the water being treated by the WTS is directed toward the connected pilot filter system. In some embodiments, the water that is diverted may be water that has undergone rapid mixing with coagulants added by the WTS but which has not yet been filtered in the WTS. That is, some of the coagulated water from the WTS may be directed toward the pilot filter system by, for example, one or more inlet pumps that draw the coagulated water from the WTS (via water pipes extending between the WTS and the pilot filter system) and inject it into a filter vessel of the pilot filter system.

The sampled water from the WTS flows into a filter vessel of the pilot filter system and passes through a filtration media bed. Some of the filtrate is discharged from the filter vessel and into a filtrate sampling system that is coupled to the filter vessel. The filtrate sampling system may be used to analyze filtrate quality and may include, for example, a turbidimeter, a pH meter, etc. In operation 406, the filtrate quality (e.g. turbidity, etc.) is monitored by the filtrate sampling system and head loss through the filtration media bed is measured.

In operation 408, the level of coagulant dose within the WTS may be adjusted based on results of analyzing sample filtrate and head loss in the pilot filter system. In particular, based on measurements obtained by the filtrate sampling system of the pilot filter system and/or calculations of head loss in the filtration media, control parameters of the WTS may be adjusted. For example, if the measured turbidity of sampled filtrate in the pilot filter system drops below a predetermined lower threshold value, it may signal an overdosing of coagulant; similarly, if the turbidity increases above a predetermined upper threshold value, it may signal an insufficient level of coagulant. The pilot filter system may transmit data generated by the filtrate sampling system to an operator of the WTS, and/or feed the data to an automated control system for the WTS such that appropriate adjustments can be made based on the transmitted data.

In some embodiments, the pilot filter system of the present disclosure may be used in various "offline testing" contexts. For example, changes in parameters or variables of water treatment in a WTS may first be tested "offline", by simulating such changes in a pilot filter system associated with the WTS. If a WTS is considering a reduction in coagulant dose, coagulated water diverted from the WTS to the pilot filter system can be diluted by combining with uncoagulated, raw source water in predetermined proportions and then run through the pilot filter system to simulate lower coagulant dose conditions. For example, if the influent flow rate to the pilot filter system is at 200 milliliters per minute, and the WTS coagulant dose is 10 milligrams per liter, an 8 milligram per liter dose may be simulated by lowering the influent pump rate to 160 milliliters per minute and adding 40 milliliters per minute of raw water to the pilot filter influent feed. An operator of the WTS can then evaluate the performance of the lower coagulant dose in the pilot filter system before determining whether to make the change at full scale in the WTS.

Additionally, the pilot filter system may aid in evaluating the effects of different types of coagulants. For example, if alternative coagulant products (e.g. aluminum sulphate, polyaluminum chloride, ferric sulphate, ferric chloride, etc.) are being considered for use with a WTS, the WTS facility can prepare mixtures of the competing coagulant products made with the same raw water, and instead of pumping WTS water from the process, the feed line would be changed from one coagulant mixture to the alternative, without stopping the pilot filter system operations.

Some filtration processes employ moving membranes for solids removal from fluids. For example, a self-indexing filter is a system that uses filter paper to remove solid particles from water. A self-indexing filter includes a tank having an open bottom. The tank is filled with the fluid to be filtered and a membrane (e.g. a cloth or felt) covers the bottom. The tank is fed with a constant flow of water and water filters through the membrane to a clean water tank underneath. Solids are captured on the membrane and eventually form a cake that blocks up the membrane. As the membrane gets blocked up, the flow of filtrate decreases and the level of water in the tank above the membrane rises. Eventually the rising water reaches a pre-set level sensor or switch, which activates a drive that progresses the membrane under the tank, pulling the blocked membrane out of the tank and drawing in new, clear membrane material for more filtering.

In some embodiments, a pilot filter system may be implemented using a self-indexing filter. For example, the pilot filter system may include a filtering apparatus, an influent pump to inject flocculated water through the membrane of the self-indexing filter, and a membrane progression mechanism which may be configured to maintain constant membrane progression/speed. If the membrane material is single-use, a roll of clean membrane material and collection system may be included, while if the material is to be re-used, the pilot filter system will include a wash system to remove solids and prevent clogging of pores.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A pilot filter system for monitoring water quality in a water treatment system, the pilot filter system comprising:
    a filter vessel containing a downward-moving bed of filtration media, the filter vessel defining an inlet port at a level vertically above the bed such that sample influent water diverted from the water treatment system flows into the filter vessel through the inlet port and over the bed, wherein the filter vessel defines a filtrate outlet port at a level vertically below the bed through which some filtrate is discharged and wherein the bed includes spherical filtering particulate;
    an influent pump for controllably injecting sample influent water diverted from the water treatment system into the filter vessel;
    a media recycle conduit fluidly connected to the filter vessel;
    a media recycler for circulating a mixture of water and used filtration media through the media recycle conduit to a point upstream of the bed in the filter vessel for redepositing on top of the bed; and
    a filtrate sampling system fluidly connected to the filter vessel via the filtrate outlet port, the filtrate sampling system including at least a turbidimeter and being used to continuously collect sample filtrate that is discharged from the filter vessel through the filtrate outlet port and determine adjustments to control parameters associated with the water treatment system, wherein the filtrate sampling system is configured to indicate when to adjust a level of coagulants that is added to pre-filtered water in the water treatment system.

2. The pilot filter system of claim 1, wherein the filter vessel includes a first media recycle port positioned at a level below the bed and a second media recycle port positioned at a level above the bed, and wherein the media recycle conduit provides fluid communication between the first media recycle port and the second media recycle port.

3. The pilot filter system of claim 2, wherein the media recycle conduit comprises a substantially vertical pipe extending between the first media recycle port and the second media recycle port.

4. The pilot filter system of claim 1, wherein the media recycle conduit comprises a media separating section in which solid particles suspended with the used filtration media are separated from the mixture to yield cleaned filtration media for redepositing on top of the bed.

5. The pilot filter system of claim 2, wherein the media recycler causes continuous upflow of the mixture in the media recycle conduit toward the second media recycle port.

6. The pilot filter system of claim 1, wherein the media recycler comprises an airlift pump.

7. The pilot filter system of claim 1, wherein the media recycler comprises an auger lift.

8. The pilot filter system of claim 1, wherein the filter vessel includes an inlet port through which sample influent water from the water treatment system is received into the filter vessel, the inlet port being positioned at a level above the bed.

9. The pilot filter system of claim 1, further comprising an effluent pump for controllably pumping filtrate out of the filter vessel through the filtrate outlet port.

10. The pilot filter system of claim 1, further comprising a pressure gauge configured to measure hydraulic pressure in or below the bed within the filter vessel.

11. The pilot filter system of claim 1, wherein the filter vessel comprises a substantially tubular filtering section and a narrower stem section extending upward from the filtering section, the bed being movably supported in the filtering section.

12. The pilot filter system of claim 1, wherein a height of the filter vessel ranges between 0.6 and 1.5 metres.

13. The pilot filter system of claim 1, wherein the bed comprises one or more of sand, anthracite, and activated carbon.

14. The pilot filter system of claim 1, wherein the filter vessel has an overflow outlet port positioned at a level above the bed, the overflow outlet port being fluidly connected to the media recycle conduit.

15. A water treatment system, comprising:
    an inlet through which water is received into the water treatment system;
    a pilot filter system associated with the water treatment system, the pilot filter system configured to receive a portion of coagulated water that is diverted from the water treatment system prior to filtration and including:
        a filter vessel containing a downward-moving bed of filtration media, the filter vessel defining an inlet port at a level vertically above the bed such that sample influent water diverted from the water treatment system flows into the filter vessel through the inlet port and over the bed, wherein the filter vessel defines a filtrate outlet port at a level vertically below the bed through which some filtrate is discharged and wherein the bed includes spherical filtering particulate;
        an influent pump for controllably injecting sample influent water diverted from the water treatment system into the filter vessel;
        a media recycle conduit fluidly connected to the filter vessel;
        a media recycler for circulating a mixture of water and used filtration media through the media recycle conduit to a point upstream of the bed in the filter vessel for redepositing on top of the bed; and
        a filtrate sampling system fluidly connected to the filter vessel via the filtrate outlet port, the filtrate sampling system including at least a turbidimeter and being used to analyze sample filtrate that is discharged from the filter vessel and determine adjustments to control parameters associated with the water treatment system, wherein the filtrate sampling system is configured to indicate when to adjust a level of coagulants that is added to pre-filtered water in the water treatment system; and a coagulant controller for controllably adding coagulant to water processed by the water treatment system prior to filtration, the coagulant controller being configured to adjust a level of coagulant dose in the water treatment system based on results of filtrate sampling in the pilot filter system.

* * * * *